May 19, 1931.  F. FULGORA  1,806,452
METHOD OF PRODUCING A BACKGROUND FOR MOVING PICTURES
Filed Jan. 31, 1928   2 Sheets-Sheet 1
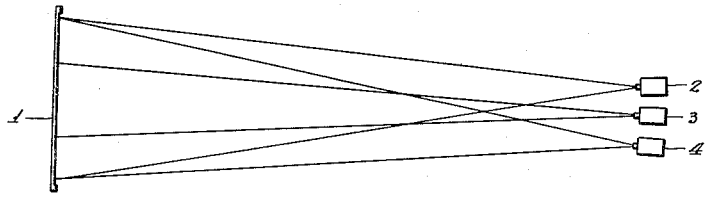
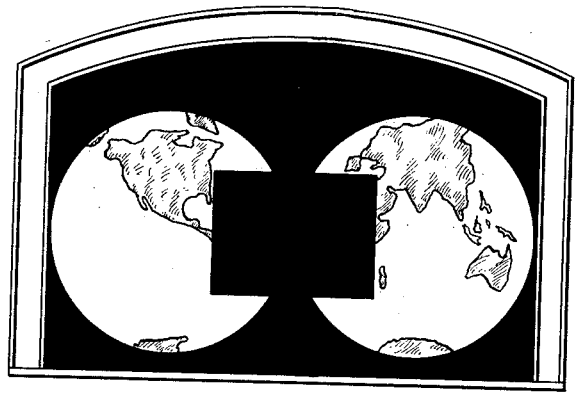
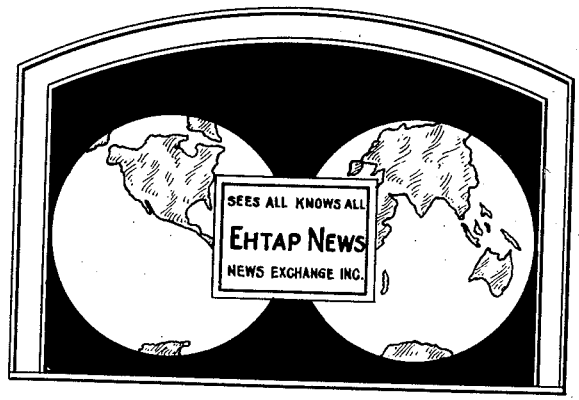
INVENTOR
Fred Fulgora May 19, 1931.  F. FULGORA  1,806,452
METHOD OF PRODUCING A BACKGROUND FOR MOVING PICTURES
Filed Jan. 31, 1928   2 Sheets-Sheet 2
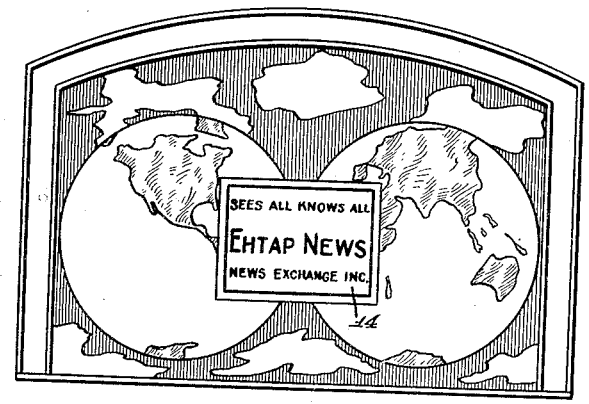
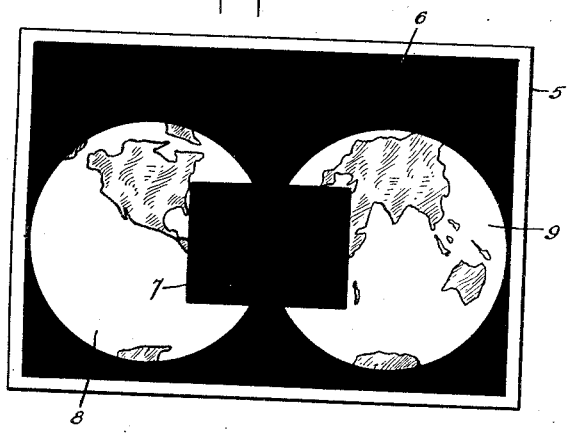
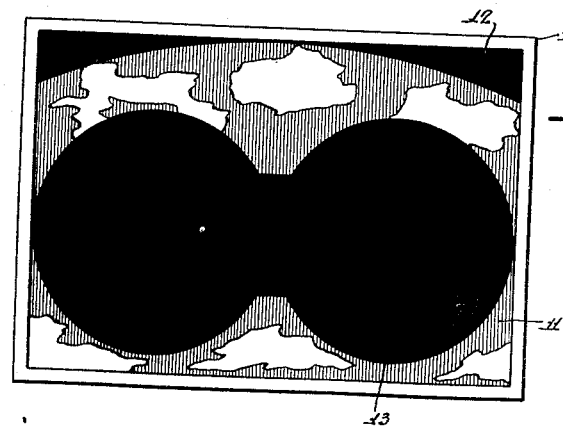
WITNESSES
INVENTOR
Fred Fulgora
BY
ATTORNEY Patented May 19, 1931

1,806,452

UNITED STATES PATENT OFFICE

FRED FULGORA, OF PITTSBURGH, PENNSYLVANIA

METHOD OF PRODUCING A BACKGROUND FOR MOVING PICTURES

Application filed January 31, 1928. Serial No. 250,910.

This invention relates to a picture projecting apparatus and method of producing or forming still and moving pictures, the object being to provide a construction where either or both may be used and different pictures projected at the same time.

Another object of the invention is to provide an improved method wherein two or more moving pictures may be used together, or a single moving picture with one or more projecting lanterns, may be used at the same time, and caused to present independent pictures to be projected on a screen at different points in such a way as to produce a single effect.

In the accompanying drawings—

Figure 1 is a diagram illustrating a screen and three projecting machines.

Figure 2 is a view of the screen when one projecting lantern is used with a certain kind of slide.

Figure 3 is a view similar to Figure 2, but showing the screen with a moving picture projector and the same lantern used in connection with Figure 2.

Figure 4 is a view similar to Figure 3, but showing the screen when a third projecting machine is used.

Figure 5 is a plan view of a slide used to produce the effect shown in Figure 2.

Figure 6 is a fragmentary view of a moving picture film showing the matter illustrated in the center of Figure 3.

Figure 7 is a plan view of a slide used in the third projector.

Referring to the accompanying drawings by numerals, 1 indicates a screen, and 2, 3 and 4 projecting machines. Usually in using a moving picture projector, only part of the screen of a moving picture house is used and sometimes the remaining part remains merely blank, while in some places a curtain is let down from above having pictures painted thereon with a hole in the curtain of the size of the picture projected by the moving picture projector.

In the present invention, a method and means have been provided whereby the ordinary moving picture projector may be used to project a picture in the center of the screen, and this ordinary moving picture projector may be used in the usual way. Associated with this moving picture projector are one or two other projectors, which may be ordinary dissolving lantern slide projectors. Under some circumstances, instead of using ordinary lanterns as the projectors 2 and 4, moving picture projectors may be used. When all three projectors are used, the result shown in Figure 4 will be presented, namely, a moving picture of news or other things will be presented in the square at the center of the screen, and on each side will be projected pictures, as for instance, two pictures of the world, and around the two pictures of the world will be clouds and a sky. The projector 3 projects the news or moving picture, the projector 2 projects the pictures of the two worlds, and projector 4 projects the clouds and the sky. Where it is desired that the world shall move and also the clouds shall move, the projectors 2 and 4 are moving picture projectors with suitable films and suitable lens to secure this result. The films may be ordinary films and suitable slides are used to block out the parts not wanted on the screen.

As an example, when the projector 3 is used, the central square is supplied with ordinary moving pictures which may be of any desired subject. At the same time that this moving picture projector is being used, the lantern 2 is used and the slide shown in Figure 5 is inserted into lantern 2. It will be noted that the slide 5 shown in Figure 5, is provided with an opaque surface 6, which merges into a square opaque surface or block 7. This leaves the spaces 8 and 9 to be projected, said spaces carrying any desired picture, as for instance, two pictures of the world. These pictures of the world are customarily used in connection with news items. Where only the slide 5 is used in connection with the moving picture projector 3, the result will be a picture as shown in Figure 3. In case it is desired to have clouds or other surrounding atmosphere, the projector 4 is used. Where this is an ordinary lantern, the slide 10 is used whereupon only the picture in the space 11 will be projected as the space 12 is covered with an opaque coating as well as the space 13. It is to be understood, of course, that the method, slides and other devices may be used with other kinds of pictures than news items. For instance, the moving picture projector 3 could project any suitable scene in the square 14, and the lantern 2 could project any other suitable scene, as for instance, a scene of woods and lakes, while the third machine 4 could, if desired, project clouds, a sunset or other picture in connection with the lakes. The slides in the lanterns 2 and 4 would be changed from time to time as the character of the moving picture changed. These changes are preferably done through the use of the dissolving feature of the lantern so that there will be no abrupt change. It is, of course, understood that a number of different slides would be necessary for the two lanterns, and these slides would necessarily be selected in respect to the particular film projected by the projector 3. The same thing would be true if the projectors 2 and 4 were moving picture projectors. In case these are moving picture projectors, the slides used would merely block out the undesired parts, but would not have pictures in the spaces 8, 9 and 11, but would leave these spaces clear and, consequently, only that part of the film would be projected so that in a case of this kind, three moving picture machines would be operating in the usual manner but with slides on two of the projectors for blocking out certain parts. If for any reason, the projectors 2 and 4 were suddenly cut out or shut off, the moving picture projector 3 could operate as usual and produce the usual picture in the center of the screen. Preferably the projectors 2 and 4 are focused so that the pictures therefrom will cover the entire arch of the stage of the theatre, whereby an atmosphere will be created which will harmonize with the moving picture being shown.

What I claim is:

The method of presenting a moving picture with a background, consisting in projecting with an ordinary moving picture machine a given picture substantially centrally of the screen, using a dissolving lantern slide projector at the same time for projecting different still pictures on said screen around the moving picture without overlapping the moving picture, and simultaneously using a second dissolving lantern for projecting a still picture around the second picture projected whereby the picture on the screen will consist of a moving picture and two projected still pictures.

Signed at Pittsburgh, Pa., in the county of Allegheny and State of Penna. this 25th day of January A. D. 1928.

FRED FULGORA.